United States Patent [19]

Klatt et al.

[11] Patent Number: 4,600,660
[45] Date of Patent: Jul. 15, 1986

[54] FOIL MATERIAL FOR THE STORAGE OF HYDROGEN

[75] Inventors: Karl-Heinz Klatt; Helmut Wenzl, both of Julich; Paul Meuffels, Geilenkirchen, all of Fed. Rep. of Germany

[73] Assignee: Kernforschungsanlage Jülich Gesellschaft mit beschränkter Haftung, Julich, Fed. Rep. of Germany

[21] Appl. No.: 556,012

[22] Filed: Nov. 29, 1983

[30] Foreign Application Priority Data

Apr. 15, 1983 [DE] Fed. Rep. of Germany ....... 3313701

[51] Int. Cl.$^4$ ............................ C01B 6/24; B32B 15/00
[52] U.S. Cl. ..................................... 428/607; 420/900; 423/644; 428/652; 428/670; 428/686
[58] Field of Search ............... 428/652, 607, 660, 668, 428/670, 650, 651, 686, 669; 420/900; 423/644, 648 R

[56] References Cited

U.S. PATENT DOCUMENTS 4,489,049 12/1984 Forester et al. ..................... 428/670

FOREIGN PATENT DOCUMENTS

| 756076 | 3/1971 | Belgium ............................. 423/248 |
| 15428 | 9/1980 | European Pat. Off. ............ 428/662 |
| 64760 | 11/1982 | European Pat. Off. ............ 420/900 |

OTHER PUBLICATIONS

Pick, M. A. et al, "Enhancement of Hydrogen Uptake Rates for Nb and Ta by Thin Surface Overlayers", *Phy. Rev. Let.*, vol. 34, No. 4, Jul. 1979, pp. 286–289.

*Primary Examiner*—L. Dewayne Rutledge
*Assistant Examiner*—Christopher W. Brody
*Attorney, Agent, or Firm*—Scully, Scott, Murphy & Presser

[57] ABSTRACT

A foil material for the storage of hydrogen in materials capable of bearing hydrogen, i.e. a hydrogen storageable material. Through the intermediary of a heat-conductive bond between a metal having hydrogen storage capability and a substrate, which is adapted for the absorption and conducting off of the reaction heat produced during hydrogen exchange, and on which the hydrogen storageable metal is applied as a storage layer, there is afforded a rapid heat exchange during the loading and unloading of the storage layer. Employed for this purpose is the heat capacity of the substrate. The material for the substrate and the volume of the latter is so selected that the reaction to heat is exchangeable with the substrate of the storage layer without the need for ancillary heat exchangers; in effect, can be taken up by or given up from the substrate. The storage layer has its exposed surface covered with a protective layer which acts in a corrosion-inhibiting manner and which is permeable to hydrogen.

8 Claims, 2 Drawing Figures

FOIL MATERIAL FOR THE STORAGE OF HYDROGEN

BACKGROUND OF THE INVENTION

1. Field of the Invention

The present invention relates to a foil material for the storage of hydrogen in materials capable of bearing hydrogen, i.e. a hydrogen storageable material.

The use of hydride formers for the storage of hydrogen is known. Utilized, in particular, are metal granulates. In the metals, the hydrogen is stored at the locations of the interstices in the crystal lattice to provide for the formation of metal hydride. Coming into consideration for technological applications are metals or metal alloys which possess a high storage capacity. The metal granulates are filled into a pressure tank, and then charged with hydrogen under a gas pressure which can range up to about 100 bar. Hereby, through the formation of systemic hydrogen superstructures in the crystal lattice, the density of the hydrogen can exceed that of liquid hydrogen. When the pressure is lowered, the storage material will then again discharge the hydrogen, which is stored in an atomic form in the metal, into the gas chamber of the pressure tank. With respect to the foregoing, reference may be had to H. Wenzl, "Metall-Wasserstoffkristalle in Festkörperforschung und Energietechnik", Annual Report of the Kernforschungsanlage Jülich GmbH, 1976/1977.

2. Summary of the Prior Art

In order to render the metal granulate receptive to hydrogen, it is necessary to create metallic surfaces which do not evidence oxide layers or other impurities which would be disruptive to the hydrogen permeation. Such surfaces are produced through activation of the metal granulate. For this purpose, the metal granulates are heated in a hydrogen atmosphere and subsequently evacuated, whereby microfissures with surfaces free of oxides are formed in the material. Ascertained to be particularly suitable have been such FeTi alloys which tend towards embrittlement, as referred to in German Pat. No. 28 40 265.

Notwithstanding all efforts which have been expended to simplify the activation processes, as exemplified by reference to German Laid-open Patent Application No. 30 22 708, the activation process complicates the handling of the metal granulate storage container. Moreover, not all suitable hydride formers allow themselves to be activated in the desired manner. The material selection and the correlation of the storage material with the technological requirements are also quite restricted.

In addition thereto, the loading and unloading of the storage material involves significant changes in heat. Thus, the loading sequence takes place exothermally, whereas the unloading is carried out endothermally. The compressed-gas storage containers which are filled with metal granulate, as a result thereof, are equipped with heat exchangers which facilitate cooling or heating of the metal granulate in the compressed-gas storage container for the support of the currently desired hydrogen exchange in the metal. The speed of the loading and unloading procedure in the compressed-gas storage container is thus dependent upon the quality of the heat exchanger; in effect, upon the attained heat transfer and upon the heat conductance. The construction of the compressed-gas storage container and its function is, as a result, quite complex.

SUMMARY OF THE INVENTION

Accordingly, it is an object of the present invention to produce a rapid heat exchange during the storage of hydrogen in a hydrogenatable material or, in essence, a material capable of bearing hydrogen. In addition thereto, there should be also increased the selection of suitable hydrogen storageable materials for the current purpose of application.

The foregoing object is achieved through the provision of the novel foil material pursuant to the invention. In accordance therewith, through the intermediary of a heat-conductive bond between a metal having hydrogen storage capability and a substrate, which is adapted for the absorption and conducting off of the reaction heat produced during hydrogen exchange, and on which the hydrogen storageable metal is applied as a storage layer, there is afforded a rapid heat exchange during the loading and unloading of the storage layer. Employed for this purpose is the heat capacity of the substrate. The material for the substrate and the volume of the latter is so selected that the reaction to heat is exchangeable with the substrate of the storage layer without the need for ancillary heat exchangers; in effect, can be taken up by or given up from the substrate. The storage layer has its exposed surface covered with a protective layer which acts in a corrosion-inhibiting manner and which is permeable to hydrogen. Because of this protective layer, the hydrogen storageable material remains free of oxide, so that the entire surface which contacts the protective layer stands available for an unhindered hydrogen exchange. This significantly increases the available selection of suitable storage materials. For a rapid loading and unloading with hydrogen, microfissures are no longer necessary in the storage material.

In order to provide for the adhesion of the storage material on the heat-absorbant substrate, and to achieve a good heat transfer, a heat-conductive adhesive layer is arranged intermediate the substrate and the hydrogen storageable material. Preferably, pursuant to a feature of the invention, the same material is employed for the protective layer and for the adhesive layer. In an advantageous manner, the storage layer is thus completely embedded in a corrosion-inhibiting, hydrogen-permeable material.

Further embodiments and features of the invention can be ascertained as described in detail hereinbelow. In accordance therewith, as the preferred material for the substrate there is employed a metal foil which evidences a high heat capacity and heat conductivity. In order to maintain the specific weight of the foil material low, the substrate is formed from aluminum or from an aluminum alloy. Suitable for the protective layer is palladium or a palladium-containing alloy. Palladium, in addition to its good corrosion resistance, is also known as a catalyst during the formation of atomic hydrogen. Palladium will thus not hinder the permeation of hydrogen at room temperature. For storage containers at higher storage temperatures in the range of between about 200° and 400° C., protective layers are also suitable protective layers which are formed of iron, nickel or platinum.

Metals or metal alloys most preferred in the formation of hydrogen storageable layer of the present invention include $LaNi_5$, $FeTiMn$ and $Mg_2Ni$, which dissolve hydrogen exothermally and discharge the hydrogen under heat absorption. Vanadium is also adapted for the storage of hydrogen, and which under each equilibrium condition (same pressure, same temperature) absorbs approximately twice as much deuterium (D) as hydrogen (H); in effect, evidences an isotropic effect. A foil material which includes vanadium as the storage material can thus be concurrently employed for hydrogen isotope separation. Preferably adapted as an adhesive layer for the hydrogen storageable metals or metal alloys is palladium or a palladium-containing alloy. The material for the adhesive layer should be so selected that the differing thermal expansion between the material of the substrate and the storage layer is so compensated that neither the adhesive layer will detach from the substrate, nor the storage layer from the adhesive layer.

A foil material which is advantageously suited for the storage of hydrogen, and concurrently for the isotope separation, consists of an about 5 to 50 μm thick aluminum foil as the substrate, and of an about 1 to 20 μm thick storage layer constituted of vanadium, which is applied onto the aluminum foil through the interposition of an 0.01 to 0.2 μm thick adhesive layer which is formed of palladium and which is covered with a protective layer of palladium correlated with the thickness of the adhesive layer.

Suitable for the formation of the inventive foil material are various coating processes, such as the vapor deposition or sputtering of material layers onto a base material. Preferably, the storage layer and the protective layer are sequentially vapor deposited or sputtered onto a substrate. When an adhesive layer is required between the storage layer and the substrate, then this layer is initially applied onto the substrate through vapor deposition or sputtering. These processes are particularly adapted to, and as a result preferred, for the production of the foil material, since it is possible to achieve an extremely intimate and pure bonding between the individual layers. The layers can be directly applied in sequence onto the substrate.

BRIEF DESCRIPTION OF THE DRAWING

Reference may now be had to the following detailed description of an exemplary embodiment of the invention, wherein FIG. 1 of the accompanying drawing schematically illustrates a storage flask for hydrogen

DETAILED DESCRIPTION

Figure 1:
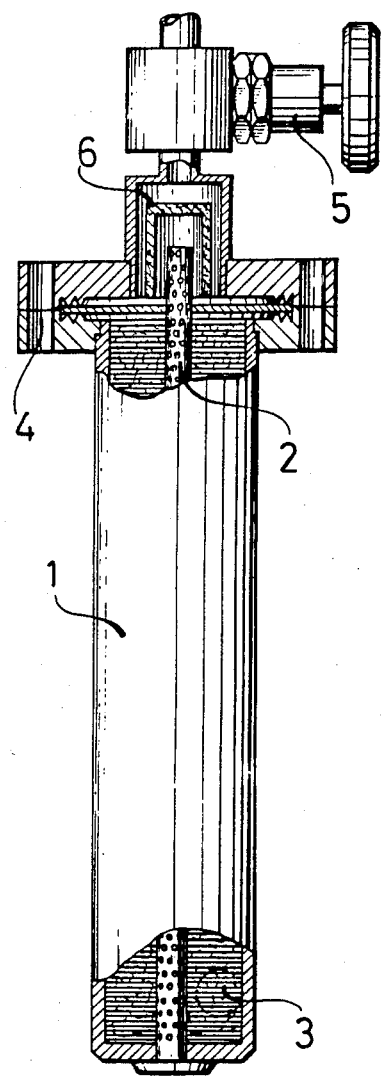
Figure 2:
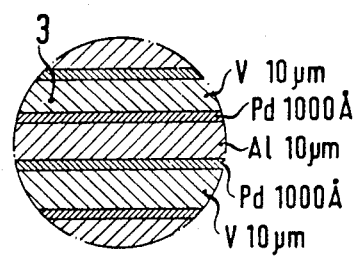
FIG. 2 is an enlargement of section "3" of FIG. 1.

Employed as the substrate for the foil material was a 10 μm thick aluminum foil. Vapor deposited as an adhesive layer onto this aluminum foil was a layer of palladium having a thickness of 0.1 μm. The adhesive layer was coated with vanadium at a thickness of about 10 μm. Applied thereon as a protective layer was a palladium layer of 0.1 μm in thickness. Thin small plates or lamina can be punched out of the finish-coated foil which, for example, can be filled into a compressed-gas flask, as described hereinbelow.

Illustrated in the drawing is a compressed-gas flask which serves as a hydrogen storage container. The compressed-gas flask is filled with foil material. To provide for filling thereof, the compressed-gas flask incorporates, within its pressure hull 1, a mandrel 2 guided in the bottom of the flask through which the punched-out pieces 3 of the foil material are introduceable into the interior of the compressed-gas flask. The compressed-gas flask can be sealed vacuum-tightly by means of a flange 4. By means of an ultra-high vacuum tightly sealed valve 5, the compressed-gas flask can be either opened and closed for the infeed and discharge of hydrogen. In order to prevent coarse contaminants from entering the interior of the compressed-gas flask, a filter 6 is inserted into the flow space between the valve 5 and the interior of the storage flask. The mandrel 2 is constructed as a hollow tube, whose cylindrical wall includes apertures spaced therealong down to the bottom of the compressed-gas flask to facilitate the through-passage of the hydrogen into the layered storage material.

The compressed-gas flask, which has an internal volume of 100 cm$^3$ was filled with lamina of foil material as described hereinabove in the exemplary embodiment, with vanadium employed as the storage layer on the aluminum foil, and employing palladium as the adhesive layer and the protective layer. The compressed-gas flask could be charged within 10 seconds to up to about 90% of its capacity at a total loading capacity of 10 l of hydrogen at room temperature and at a pressure of 10 bar. The reaction heat which was produced during the hydrogen absorption was transmitted to the material of the substrate. As a result, the compressed-gas flask only warmed up only a few °C. Also during an emptying of the compressed-gas flask, the temperature drop-off remained low. The heat required for the endothermal reaction was provided by the aluminum substrate.

In addition to the utilization of the foil material in a compressed-gas flask for the storage of hydrogen, the foil material, for example, can also be employed as work medium storage containers for thermal compressors, or in the temperature sensor of a thermostatic expansion valve, as is described in the currently pending, unpublished German Patent Application No. P 32 24 731. When employing vanadium as the storage layer, the foil material can also be used for the separation of hydrogen isotopes.

Employable for the production of the foil material are vapor deposition processes, such as the flash process or vapor deposition with electron beam guns. In the flash process, solid granulate particles of an alloy are evaporated in an extensively superheated crucible, and the vapor condensed on cooled foils. When employing electron beam guns, all storage materials can be evaporated and precipitated onto substrates. In addition to these processes, there can also be utilized the sputtering process. Herein, within an electrical high-voltage field, material is torn out from a suitable target material through bombardment with inert gas ions, and separated onto a substrate. Reigning between the target and the substrate is a voltage of a few thousand volts.

What is claimed is:

1. A foil material for the storage of hydrogen in a hydrogen storageable material comprising a substrate; a hydrogen storageable metal forming a storage layer, a heat-transmissible adhesive layer for adhering said storage layer onto said substrate, said substrate being adapted for the absorption and production of reaction heat generated during hydrogen exchange, said hydrogen storageable metal being heat conductively applied onto said substrate through said heat-transmissible adhesive layer; and a protective layer which is oxidation-inhibiting and hydrogen-permeable being applied onto said hydrogen storageable metal.

2. Foil material as claimed in claim 1, wherein the protective layer and the adhesive layer are formed of the same material.

3. Foil material as claimed in claim 1 or 2, comprising an intermediate foil which is said substrate.

4. Foil material as claimed in claim 3, wherein said substrate comprises aluminum or an aluminum alloy.

5. Foil material as claimed in claim 1, wherein said protective layer comprises palladium or palladium-containing alloy.

6. Foil material as claimed in claim 1, wherein said storage layer comprises a material selected from the group consisting of $LaNi_5$, FeTiMn, $Mg_2Ni$ or vanadium.

7. Foil material as claimed in claim 6, wherein said adhesive layer comprises palladium or a palladium-containing alloy.

8. Foil material as claimed in claim 7, comprising a 5 to 15 μm thick aluminum foil and a 1 to 20 μm thick hydrogen storageable foil of vanadium, an adhesive layer having a thickness of 0.1 to 0.2 μm interconnecting said layers, and a protective layer of palladium being applied onto the hydrogen storageable layer having a thickness corresponding to the adhesive layer.

* * * * *